United States Patent Office 3,420,802
Patented Jan. 7, 1969

3,420,802
NOVEL POLYESTERAMIDES AND THE PREPARATION THEREOF
Jack G. Scruggs, Cary, N.C., assignor to Monsanto Company, St. Louis, Mo., a corporation of Delaware
No Drawing. Filed Apr. 21, 1965, Ser. No. 449,891
U.S. Cl. 260—75   2 Claims
Int. Cl. C08g 20/30

ABSTRACT OF THE DISCLOSURE

Novel polyesteramides characterized by a regularity of recurrence of the ester and amide linkages in the unit repeating chain and having the formula

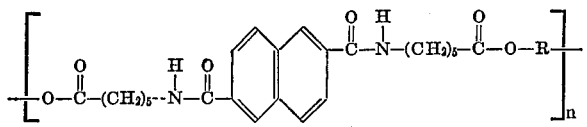

wherein R is an aliphatic or cycloaliphatic radical. These polymers may be produced by polycondensing 2,6-naphthalene dicarboxylic acid diamide-N,N'-di-ε-caproic acid or its ester-forming derivatives, such as the chloride and diester derivatives thereof, with aliphatic or cycloaliphatic glycols.

---

Polyesteramides have been described as early as 1932, but they received very little attention for textile uses becaus of poor color and low crystallinity. Generally, they have been prepared by the reaction of a dibasic acid or its ester with amino alcohols or a mixture of a diamine and a glycol. The first major breakthrough in polyesteramide preparation was the use of intermediates containing preformed amide links, a technique which prevented side reactions leading to color formation. This technique also resulted in a polymer containing regularly recurring ester and amide groups thereby producing a more crystalline structure. The polyesteramides containing regularly recurring ester and amide groups have considerable utility for textile applications because of their improved properties.

It is an object of this invention to provide novel polyesteramides having regularly recurring ester and amide groups in the unit repeating chain.

Other objects and advantages of this invention will be apparent from the description herein and the chains which follow.

The novel polyesteramides of this invention are characterized by a regularity of recurrence of the ester and amide linkages in the unit repeating chain and have the formula

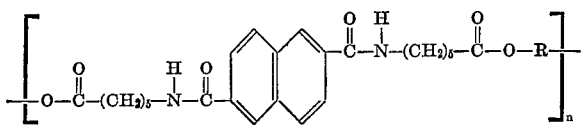

wherein R is an aliphatic or cycloaliphatic radical. These polymers may be produced by polycondensing 2,6-naphthalene dicarboxylic acid diamide-N,N'-di-ε-caproic acid or its ester forming derivatives, such as the chloride and diester derivatives thereof, with aliphatic or cycloaliphatic glycols. Preferably, the polyesteramide of this invention is prepared by polycondensing the dimethyl ester of 2,6-naphthalene dicarboxylic acid diamide-N,N'-di-ε-caproic acid and an excess of ethylene glycol in the presence of a polycondensation catalyst and under polyester forming conditions.

Although it is preferable to use the dimethyl ester of 2,6-naphthalene dicarboxylic acid diamide-N,N'-di-ε-caproic acid, other derivatives of this acid such as its dichloride or other diesters with lower alcohols such as ethyl alcohol, propyl alcohol, butyl alcohol, and the like may be used. The dimethyl ester of 2,6-naphthalene dicarboxylic acid diamide-N,N'-di-ε-caproic acid which is preferably used may be obtained by hydrolysis or alcoholysis of two moles of caprolactam obtainable by a Beckmann conversion, from cyclohexanone oxime in sulfuric acid solution with methanol, and subsequent reaction of the ε-amino caproic acid or its methylester thus obtained with one mole of the chloride of 2,6-naphthalene dicarboxylic acid. The compound obtained is then polycondensed with an excess of glycol, such as ethylene glycol, in the presence of a polycondensation catalyst to give the polyesteramide of this invention.

Any aliphatic or cycloaliphatic glycol may be used to prepare the composition of this invention. Illustrative of glycols that may be used are ethylene glycol, propylene glycol, butylene glycol, 1,4-cyclohexanedimethanol, and the like.

In the preparation of the polymers of this invention, the reactive intermediate, such as the di-glycol ester of 2,6-naphthalene dicarboxylic acid diamide-N,N'-di-ε-caproic acid, is normally obtained and then polymerized. When employing the 2,6-naphthalene dicarboxylic acid diamide-N,N'-di-ε-caproic acid per se as a starting material, the polymer preparation is conducted in two stages. In the first stage, the acid is reacted with an amount of ethylene glycol which exceeds the stoichiometric quantity to form the di-glycol ester of the acid. This monomer is then polycondensed in the second stage reaction to form the polymer. The amount of glycol employed in this reaction is not critical beyond the requirement that at least more than a stoichiometric quantity be present. Generally, high proportions of the glycol relative to the esters or acids are used. For example, up to 10 times as many moles of glycol as ester or acid may be employed because the reaction takes place more readily in the presence of an excess of glycol.

The conditions necessary for these reactions are well known and will be readily understood by those skilled in the art. During the first stage in which the di-glycol ester is formed, the reaction is carried out at atmospheric pressure and at a temperature in the range of from about 175° to 195° C. and preferably between about 180° and 190° C. At the completion of the first stage, the excess glycol is distilled off prior to entering the second stage of polycondensation. In the second or polymerization stage the reactive intermediate, such as the bis-2-hydroxyethyl ester of 2,6-naphthalene dicarboxylic acid diamide-N,N'-di-ε-caproic acid, is heated at a still higher temperature of from about 230° to 250° C. and under reduced pressure within the range of from about 0.1 to 5 mm. of mercury to form the polymer. The second or polymerization step is continued, if a fiber-forming polymer is desired, until the reaction product has the desired degree of polymerization, which may be determined by viscosity measurements. Normally, high molecular weight polymers in the fiber-forming range can be obtained in from about 30 minutes to one hour of polymerization reaction time.

When employing the dialkyl esters of 2,6-naphthalene dicarboxylic acid diamide-N,N'-di-ε-caproic acid as a starting material, the procedural steps are essentially the same as outlined above. In the first stage, an ester-interchange reaction is conducted between the glycol and the dialkyl ester, for example, the dimethyl ester of 2,6-naphthalene dicarboxylic acid diamide-N,N'-di-ε-caproic acid at normal pressures and a temperature of between 175° to 195° C. The di-glycol ester of 2,6-naphthalene dicarboxylic acid diamide-N,N-di-ε-caproic acid is formed during this reaction together with methanol which is removed from the reaction zone. The polycondensation stage is conducted at reduced pressures of from about 0.1 to 5 mm. of mercury at a temperature in the range from about 230° to 250° C. Again, a high molecular weight polymer can be obtained in from about 30 minutes to one hour.

Any suitable polycondensation catalyst may be used to carry out the reactions of this invention and these are well known in the art. However, it is preferable to use zinc acetylacetonate as the catalyst. The catalyst used, such as zinc acetylacetonate, is present in both the first and second reaction steps which have been described above. The amount of catalyst present may be widely varied and is not critical. All that is necessary is a catalytic amount. For example, good results can be obtained with a catalytic concentration varying between 0.001 to 2.0 percent by weight, based on the acid or ester forming derivative thereof, with from about 0.1 to 1.0 percent being preferable.

The reactive intermediate which is polymerized to obtain the polymer may be prepared separately from the polymer forming reaction and used at a later time. It may also be prepared by other means than discussed above, for example, by reacting 2,6-naphthalene dicarboxylic acid diamide-N,N'-di-ε-caproic acid with ethylene oxide. Usually, however, this intermediate is obtained in the manner described.

To further illustrate the invention and the advantages thereof, the following example is given, it being understood that it is intended to be illustrative only and not limitative. All given parts are by weight unless otherwise indicated. In the example the specific viscosity measurements given are directly related to the degree of polymerization attained and the polymer molecular weight. Specific viscosity values of at least about 0.3 represent fiber- and filament-forming polymers.

Specific viscosity, as employed herein, is represented by the formula $$N_{sp} = N_{Rel.} - 1$$

where $$N_{Rel.} = \frac{\text{Time of flow of the polymer solution in seconds}}{\text{Time of flow of the solvent in seconds}}$$

Viscosity determinations on he polymer solutions and solvent are made by allowing said solutions and solvent to flow by gravity at 25° C. through a capillary tube. In all determinations the polymer solutions contained 0.55 gram of the polymer dissolved in 100 cc. of solvent consisting of a mixture containing 60 percent by weight of phenol and 40 percent by weight of tetrachloroethane.

Example

A mixture containing 25 grams of the dimethyl ester of 2,6-naphthalene dicarboxylic acid diamide-N,N'-di-ε-caproic acid (prepared from the acid chloride of 2,6-naphthalene dicarboxylic acid and caprolactam in a 1 to 2 molar ratio, followed by esterification with methanol), 50 ml. of ethylene glycol and .025 gram of zinc acetylacetonate was heated in an autoclave with stirring at a temperature of 190° C. with the simultaneous distillation removal of the methanol formed by the interaction of these materials. After one hour at 190° C., the temperature was raised to 255° to 258° C. with the simultaneous removal of the excess glycol. A vacuum of 0.2 mm. was then applied to the system and the reaction was heated at 255°–258° C. with stirring for 45 minutes. The final product was a white polymer having a melting point of 226° C. and a specific viscosity of 0.64.

It is known from the prior art to prepare a polymer from the dimethyl ester of terephthalic acid diamide-N,N'-di-ε-caproic acid and ethylene glycol. However, this polymer was reported to be a dark color, having a melting point of 213°– 216° C. and a specific viscosity of 0.49. By using the acid disclosed herein in place of the terephthalic acid of the prior art, a polymer having a higher melting point, better color and higher molecular weight may be obtained.

It is to be understood that changes and variations may be made in the present invention without departing from the spirit and scope thereof as defined in the appended claims.

What is claimed is:

1. Novel fiber-forming polymeric polyesteramide characterized by a regularity of recurrence of the ester and amide linkages in the unit repeating chain and consisting essentially of units having the formula

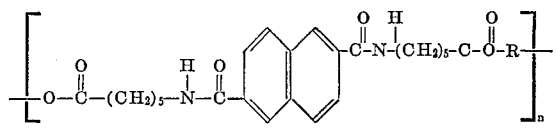

wherein R is selected from the group consisting of aliphatic and cycloaliphtic radicals.

2. A novel fiber-forming polymeric polyesteramide characterized by a regularity of recurrence of the ester and amide linkages in the unit repeating chain and consisting essentially of units having the formula

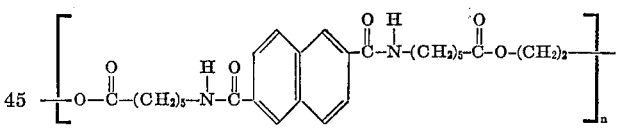

References Cited

UNITED STATES PATENTS 3,033,826    5/1962    Kibler et al. _____ 260—75
3,153,011    10/1964    Scruggs _____ 260—75

WILLIAM H. SHORT, Primary Examiner.

LOUISE P. QUAST, Assistant Examiner.

U.S. Cl. X.R.

260—475, 558